United States Patent [19]

Toda

[11] Patent Number: 4,878,715

[45] Date of Patent: Nov. 7, 1989

[54] BRAKE CONTROL DEVICE FOR VEHICLES

[75] Inventor: Hiroshi Toda, Kariya, Japan

[73] Assignee: Aisin Seiki Kabushiki Kaisha, Kariya, Japan

[21] Appl. No.: 243,846

[22] Filed: Sep. 13, 1988

[30] Foreign Application Priority Data

Sep. 17, 1987 [JP] Japan .................................. 62-231134

[51] Int. Cl.$^4$ .............................................. B60T 8/48
[52] U.S. Cl. .................................... 303/110; 303/116; 180/197
[58] Field of Search ................. 180/197; 303/100, 103, 303/106, 110, 114, 116, 119

[56] References Cited

U.S. PATENT DOCUMENTS 4,715,663  12/1987  Hattori et al. ................... 303/116 X
4,765,691  8/1988   Inoue et al. ...................... 303/119 X Primary Examiner—Duane A. Reger
Attorney, Agent, or Firm—Burns, Doane, Swecker & Mathis

[57] ABSTRACT

A brake control device for vehicles includes a master cylinder, a wheel cylinder connected to the master cylinder for braking operation, an anti-skid brake control circuit disposed between the master and wheel cylinders and including pump as a power source. The brake control device further includes a traction control circuit disposed between the anti-skid brake control circuit and the master cylinder and including a valve having a first mode wherein the master cylinder and the wheel cylinder are in communication without the pump and a second mode wherein the master cylinder and the wheel cylinder are in communication with the pump, and a change over member is provided for changing the modes of the valve.

6 Claims, 4 Drawing Sheets

BRAKE CONTROL DEVICE FOR VEHICLES

BACKGROUND OF THE INVENTION

1. Field of the Invention

This invention relates to a brake control device for vehicles which includes an anti-skid control function for preventing the wheels from skidding and a traction control function for preventing the wheels from slipping.

2. Description Of Prior Art

One of the examples of the brake control device of the above type is shown in a Japanese patent application published on Feb. 6, 1982 bearing publication number 57-22948 (the structure thereof is shown in FIG. 8 ). In the drawing, upon the braking operation by the depression of the brake pedal 1, the pressure in the master cylinder 2 is supplied to the wheel brakes via valves 3, 4 and 5. Under these situations, the pressure from the master cylinder is also supplied to the TRC inlet port 6 via passage L1 to change over the connection with the port 6a to the port 6c. Upon the anti-skid control operation, if the change over valve 3 is in an inoperative position as shown in FIG. 8, the pressure at the wheel brakes increase and if the valve 3 is in operative position, the pressure at the wheel brakes decrease due to the disconnection between the port 3a and the master cylinder and the connection between the port 3b and port 3c whereby the pressure at the wheel cylinders returns to the pump 7 via TRC inlet valve 6 and passage L4. Further, when the traction control is under operation, the pressure at the wheel brakes increase due to the connection between ports 3b and 3c.

Such conventional device, however, has a drawback that the structure of the TRC is very complex because of the too many components such as inlet valve 6, change over valves 3 and 4 or 5. It is therefore difficult to automatically add the components of TRC into the ABS system ( Anti-skid system ). Another drawback is that the TRC operation is not stable due to the high pressure passing through the three ports which may cause leakage of fluid and delay of response at the valves.

SUMMARY OF THE INVENTION

It is an object of the present invention to provide an improved brake control device for vehicles which can obviate the above conventional drawbacks.

It is another object of the present invention to provide an improved brake control device for vehicles which has a master cylinder, a wheel cylinder connected to the master cylinder for braking operation, an anti-skid brake control circuit disposed between the master and wheel cylinders and including pump as a power source, a traction control circuit disposed between the anti-skid brake control circuit and the master cylinder and including valve means having a first mode that the master cylinder and the wheel cylinder are in communication without the pump therebetween and a second mode that the master cylinder and the wheel cylinder are in communication with the pump therebetween and a change over means for changing the modes of the valve means.

It is an object of the present invention to provide an improved brake control device for vehicles which can obviate the above conventional drawbacks and which includes the change over means of the traction control circuit including a first change over means for changing the modes of the valve means and a second change over means for changing the valve means from the second mode to the first mode when the pressure in the anti-skid brake control circuit reaches a predetermined level.

BRIEF DESCRIPTION OF THE DRAWINGS

Various other objects, features and attendant advantages of the present invention will be more fully appreciated as the same becomes better understood from the following detailed description when considered in connection with accompanying drawings.

DETAIL DESCRIPTION OF THE EMBODIMENT

Figure 1:
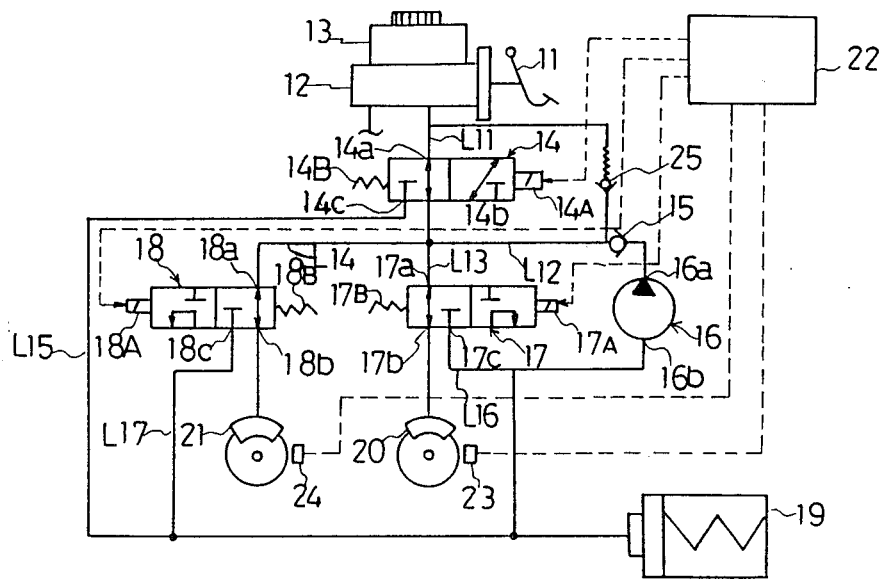
FIG. 1 shows a fluid circuit of a first embodiment of the present invention.
Figure 2:
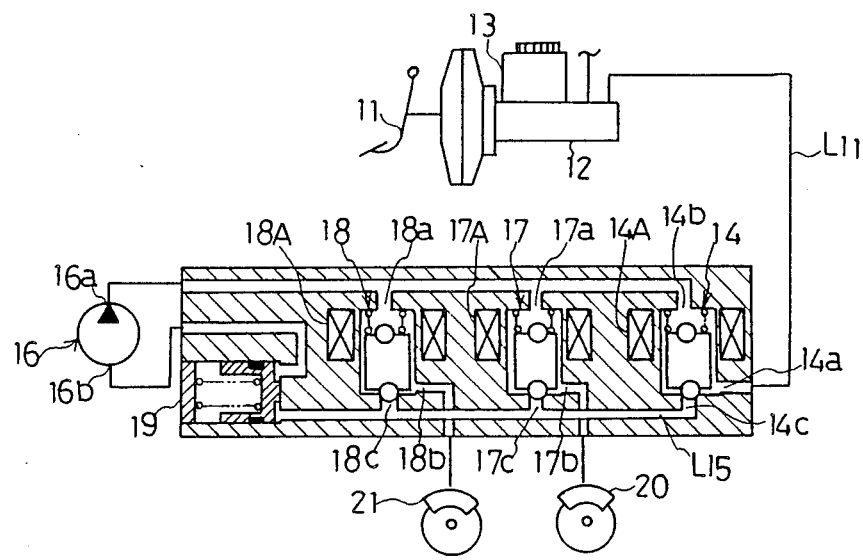
FIG. 2 shows a schematic view of the fluid circuit of the first embodiment of the present invention.

Referring now to the drawings particularly to FIGS. 1 and 2, a discharge type ABS system is shown and master cylinder 12 is connected to the reservoir 13. Brake-pedal 11 is connected to the master cylinder which is further connected to the inlet port 14a of the TRC (Traction Control) change over valve 14 via passage L11.

The TRC valve 14 is of three ports-two positions type. The inlet port 14a is connected to one outlet port 14b when the solenoid 14A is off and is connected to the other outlet port 14c by overcoming the spring force 14B when the solenoid 14A is on.

The outlet port 14b of the TRC valve 14 is connected to the outlet port 16a of the pump 16 via passage L12 and check valve 15 and also is connected to inlet port 17a of the ABS valve 17 for right wheel control via passage L13 and inlet port 18a of the ABS valve 18 for left wheel control via passage L14.

The outlet port 14c of the TRC valve 14 is connected to inlet port 16b of the pump 16 via the reservoir 19 and passage L15.

The ABS valve 17 for the right wheel control is of three ports-two positions type for duty control. When the duty solenoid 17A is off, the inlet port 17a is connected to the outlet port 17b. When the duty solenoid 17A is on, the inlet port 17a is connected to the outlet port 17b by overcoming the force of spring 17B thereby to interrupt the communication between the inlet port 17a and the outlet port 17b. The outlet port 17b is connected to the wheel cylinder 20 for right wheel and the outlet port 17c is connected to reservoir 19 and the inlet 16a of pump 16 via passage L16.

Similarly, the ABS valve 18 for the left wheel control is of three ports-two positions type for duty control. When the duty solenoid 18A is off, the inlet port 18a is connected to the outlet port 18b. When the duty solenoid 18A is on, the inlet port 18a is connected to the outlet port 18b by overcoming the force of spring 18B thereby to interrupt the communication between the inlet port 18a and the outlet port 18b. The outlet port 18b is connected to the wheel cylinder 21 for left wheel and the outlet port 18c is connected to reservoir 19 and the inlet 16b of pump 16 via passage L17.

The discharge type ABS system of this invention provides for traction control by adding a single TRC (Traction Control) change over valve 14 to the ABS actuator which is comprised of ABS change over valves 17 and 18, a reservoir 19 and a pump 16.

Solenoid 14A for TRC change over valve 14 and duty solenoids 17A and 18A for ABS change over valves are ON-OFF controlled by the signals from microprocessor 22. The microprocessor 22 outputs signals based upon speed sensors 23 and 24 installed at the right wheel and left wheel, respectively.

Each stage of operation will be explained hereinafter:

(1) normal brake operation:

Since the solenoids 14A, 17A and 18A are off, the TRC and ABS change over valves are at the positions shown in FIGS. 1 and 2.

Under these conditions, when the brake pedal 11 is depressed, the pressure from the master cylinder 12 is supplied to the wheel cylinders 20 and 21 via passage L11, inlet and outlet ports 14a and 14b of TRC change over valve 14, passage L13, inlet and outlet ports 17, 18a, 18b and 71a, 17b of TRC change over valves 18, 17.

(2) ABS pressure reduction stage:

Under the normal braking, speed sensor 23 (or 24) detects thelocking tendency of the right wheel ( or the left wheel), microprocessor 22 outputs signal to the duty solenoid 17A( or 18A ) therby to energise ABS change over valve 17 (or 18). Thus, the communication between the inlet and outlet ports 17a and 17b( or 18a and 18b) is disconnected and instead, the communication between the outlet ports 17b and 17c ( or 18b and 18c) is established to discharge the pressure in the wheel cylinder 20( or 21 ) to the reservoir 19 via outlet ports 17b and 17c of the ABS change over valve 17 and passage L16, or outlet ports 17b and 18c of the ABS change over valve 18 and passage L17. The excess pressure returns to the upper stream side (master cylinder side ) of the ABS change over valve 17 and 18) by the operation of the pump.

(3) ABS pressure increase stage:

Due to the pressure reduction operation above, locking tendency of the right wheel (or the left wheel) is released and the speed sensor 23( or 24) detects the change of the locking tendency, whereupon the microprocesor 22 stops energization of the duty solenoid 17A (or 18A). Thus, the communication between the outlet port 17b and outlet port 17c (or 18b and 18c) is disconnected and instead, the communication between the inlet and outlet ports 17a and 17b (or 18a and 18b) is reconnected toincrease the pressure in the wheel cylinder 20 (or 21) by operation of the pump via ports 17a and 17b of the ABS change over valve 17 or inlet port 18a and outlet port 18b of the ABS change over valve 18.

(4) TRC pressure increase stage:

For example if the speed sensor 23 senses the slipping of the right wheel, ON signal is generated by the microprocessor 22 to energize the solenoids 14A and 18A to change over the valves 14 and 18.

Thus, the communication between the inlet and outlet ports 14a and 14b of the TRC change over valve 14 is disconnected and instead, the communication between the inlet and outlet ports 14a and 14c of the TRC change over valve 14 is established thereby to establish TRC circuit of reservoir 13, master cylinder 12, passage L11, inlet and outlet ports 14a and 14c, passage L15 and inlet 16b of the pump 16. Fluid from the reservoir 13 is driven by the pump to increase the pressure at the wheel cylinder 20 via ABS change over valve 17.

Since the duty solenoid 18A is on during the TRC pressure increase stage of the wheel cylinder 20 at the right wheel, the communication between the inlet port 18a and outlet port 18b which communicates with wheel cylinder 21 is disconnected and therefore, the pressure at the left side wheel cylinder 21 will not be increased by the pump 16.

When the sensor 24 senses the slipping conditions of the left side wheel, the microprocessor 22 outputs signal to solenoids 14A and 17A to reverse the fluid communication thereby to increase the pressure at the left side wheel cylinder 21. When the slipping conditions at both right, and left wheels are detected, the signal from the microprocessor 22 is transmitted only to the solenoid 14A, whereby the duty solenoids 17A and 18A remain off. Thus the pressure at the wheel cylinders 20 and 21 are both increased.

(5) TRC pressure reduction stage:

For example, when the sensor 23 senses the recovery of the slipping at the right wheel, the on-signal to the solenoid 14A is ceased and instead, the on-signal is transmitted to the duty solenoid 17A. Thus the communication between the inlet and outlet ports 14a and 14b of the TRC change over valve 14 also the outlet ports 17b and 17c of the ABS change over valve 17 are reestablished. Thus the pressure at the wheel cylinder 20 is driven to the reservoir 13 by the pump 16 via outlet ports 17b and 17c of the ABS change over valve 17, passage L16, pump inlet 16b, pump outlet 16a, passage L12. outlet port 14b and inlet port 14a of the TRC change over valve 14 and master cylinder 12.

Similarly, when the left wheel cylinder 21 is under TRC pressure increase operation and the slipping stops, the pressure reduction will be carried out at the left wheel cylinder 21.

If both wheel cylinders 20 and 21 are under TRC pressure increase operation and one of the wheels stops the slipping, the other wheel cylinder may receive the pressure increase. The pump 16 will continue to be driven to- make a closed circuit of pump outlet 16a, TRC change over valve 14 and ABS change over valves 17 and 18. Thus the pressure in closed circuit may abnormally increase to cause the system to its dangerous conditions.

In order to prevent the undesired increase of pressure and accordingly the breakage of the circuit, following means are adapted:

① detecting the undesired high pressure at the circuit by the microprocessor 22 stop the pump operation:

② detecting the valve on-off conditions of the TRC and ABS change over valves 14, 17 and 18 and stop the pump operation:

③ providing a relief valve 25 between the pump outlet 16a and passage L11 as shown in FIG. 1 to relieve the pressure to the pump inlet side:

④ detecting the undesired high pressure and disconnect the on-signal to the solenoid 14A thereby to return the TRC valve 14 to its original position:

⑤ providing a relief structure in the TRC change over valve 14 by forcing the pressure in the closed circuit in the direction same with the direction of spring 14B to change over the valve position thereby to discharge the pressure to master cylinder side.

Figure 3:
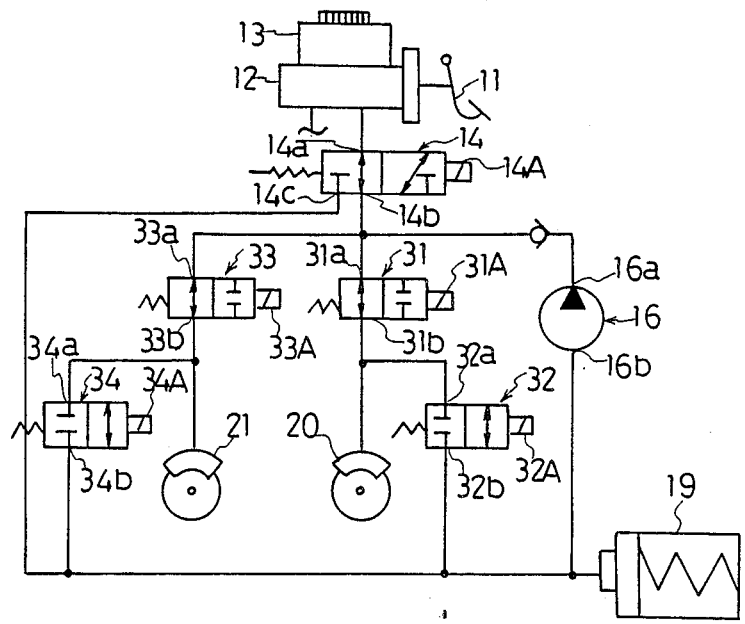
FIG. 3 shows a second embodiment of the present invention.

FIG. 3 shows another embodiment of the present invention. The first embodiment shown in FIGS. 1 and 2 shows a discharge type ABS system whereas this embodiment shows a hold type ABS system connected by a single TRC change over valve to add the TRC function in addition to the ABS function.

This system includes a pair of ABS inlet valves 31 and 33 and a pair of ABS outlet valves 32 and 34 for left and right wheel cylinders, respectively and each valve is electrically connected to microprocessor 32 to on-off control the solenoids 31A, 32A, 33A and 34A. The ABS inlet valves 31 and 33 are open when the solenoids 31A and 33A are off, respectively and the ABS outlet valves 32 and 34 are closed when the solenoids 32A and 34A are on, respectively. The TRC change over valve 14 of this embodiment is same with the one in the previous embodiment and the same reference numbers are used to the same portions and devices.

The inlet port 14a of the TRC valve 14 is connected to the reservoir 13 and the master cylinder 12 and outlet port 14b is connected to the inlet ports 31a and 33a of the ABS inlet valves 31 and 33 and outlet 16a of the pump 16. The other outlet port 14c of the TRC valve 14 is connected to the reservoir 19 and inlet 16b of the pump 16.

The outlet ports 31b and 33b of the ABS inlet valves 31 and 33 are connected to the left and right wheel cylinders 20 and 21 and inlet ports 32a and 34a of the ABS outlet valves 32 ad 34 are connected to the left and right wheel cylinders 20 and 21 and outlet ports 32b and 34b are respectively connected to the reservoir 19 and inlet 16b of the pump 16.

The operation modes of this embodiment are as follows:

(1) normal brake operation:

All the solenoids are off and when the brake pedal is depressed, the pressure is transmitted to wheel cylinders 20 and 21 via TRC valve 14 and ABS inlet valves 31 and 33 to perform brake operation.

(2) ABS pressure reduction stage:

Solenods 31A and 32A (or 33A and 34A) are on the ABS inlet valve 31 and outlet valve 33 (or 32 and 34) are actuated to change the communication to reduce the pressure in the wheel cylinder 20 (or 21) is discharged into the rservoir 19.

(3) ABS pressure increase stage:

Solenoid 14a is on to actuate the TRC valve 14 and reservoir 13 is connected to the inlet 16b of the pump 16 via the master cylinder 12 and TRC valve 14. By driving the pump 16, the pressure is supplied to the wheel cylinder 20 from the reservoir 13 via ABS inlet valve 31(or to the wheel cylinder 21 via ABS inlet valve 33).

If only one of the wheel cylinders, for example, wheel cylinder 20 is under the TRC pressure increase operation, solenoid 33A turns on to actuate the other wheel cylinder 21.

(5) TRC pressure reduction stage:

Solenoid 14A is off and solenoids 31A and 32A ( or 33A and 34A) are on and the master cylinder 12 is connected to the outlet 16a of pump 16. The communication between the wheel cylinder 20(or 21) and outlet 16a of pump 16 is disconnected while the communication between the wheel cylinder 20 and the inlet 16b of pump 16 is established to discharge the pressure in the wheel cylinder 20 (or 21) to the master cylinder side by the driving operation of the pump 16 via TRC valve 14 thereby to perform the TRC pressure reduction at the wheel cylinder 20 (or 21).

In order to prevent the undesired pressure increase in the closed circuit of outlet 16a of pump 16, TRC valve 14, ABS inlet valves 31 and 33, the pump 16 may be stopped by detecting the abnormality at the microprocessor 22 or may be provided with a relief valve between the inlet and outlet of the pump 16 or a relief function may be added into the TRC change over valve 14.

Figure 4:
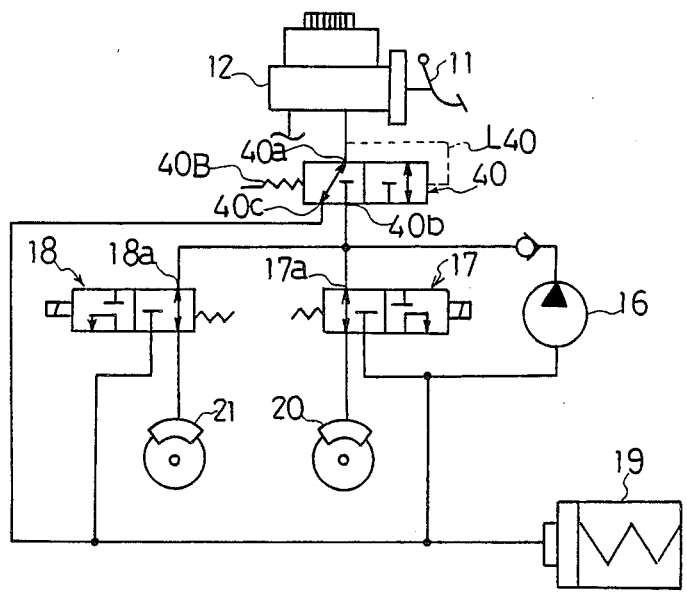
FIG. 4 shows a third embodiment of the present invention.

FIG. 4 shows further embodiment of the present invention, the system is of the discharge type ABS and therefore the structure is similar with the first embodiment shown in FIGS. 1 and 2 except the function of the TRC valve. The TRC valve 40 is actuated by the master cylinder pressure. When the master cylinder pressure is not acted upon the TRC valve 40, inlet port 40a is displaced to the position where the it is communicable with the outlet port 40c which communicates with reservoir 19 and pump 16 by the force of spring 40B. When the brake pedal 11 is depressed, pressure is applied to the TRC valve 40 from the master cylinder 12 and the TRC valve 40 is moved against the force of spring 40B to be actuated to establish the communication between the inlet port 40a and outlet port 40b which is connected to the inlet ports 17a and 18a of the ABS valve 17 and 18. Accordingly, under normal braking and ABS braking, inlet port 40a and outlet port 40b are in communication and under TRC braking, inlet port 40a and outlet port 40c are in communication to perform the same modes of braking to those of the first embodiment shown in FIGS. 1 and 2.

Figure 5:
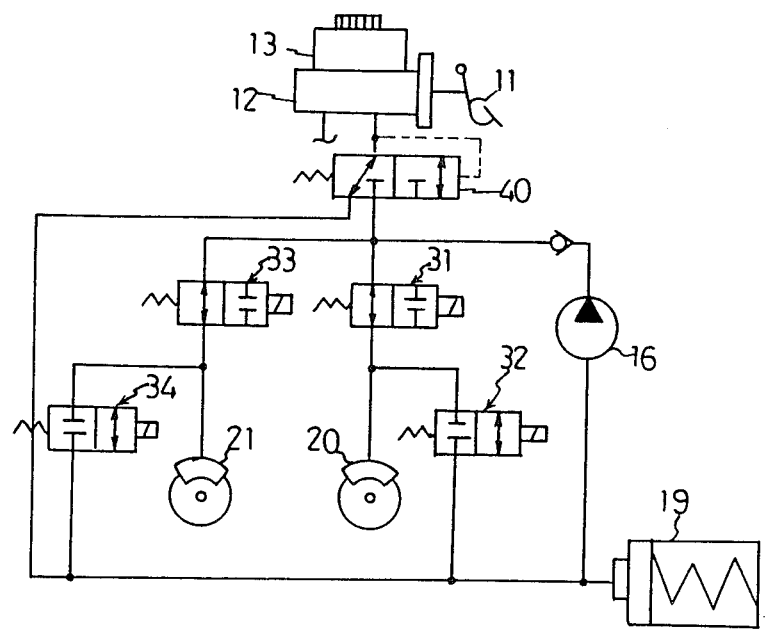
FIG. 5 shows a fourth embodiment of the present invention.

FIG. 5 shows a fourth embodiment of the present invention wherein the system shows a hold type as shown in FIG. 3 and the TRC change over valve 40 is of the type shown in FIG. 4 wherein the TRC valve is actuated by the master cylinder pressure. The same reference numbers are shown on the same or similar parts or devices. The operation of this embodiment is similar to the previous embodiments and are detail being omitted.

Figure 6:
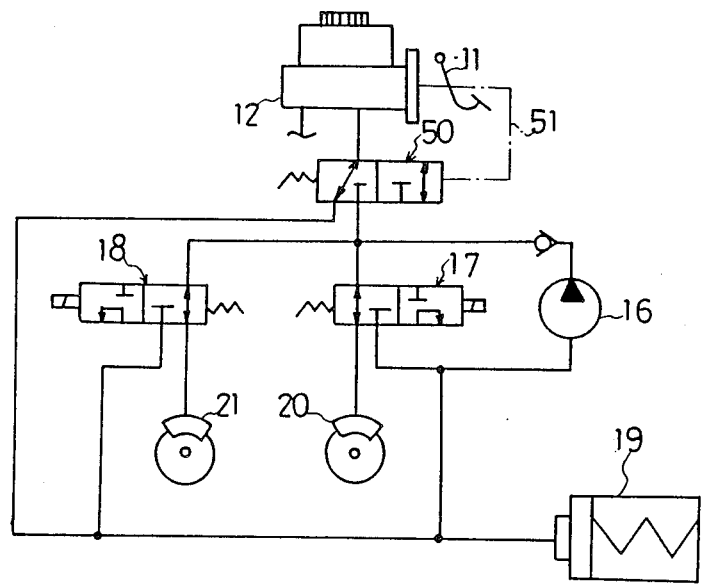
FIG. 6 shows a fifth embodiment of the present invention.
Figure 7:
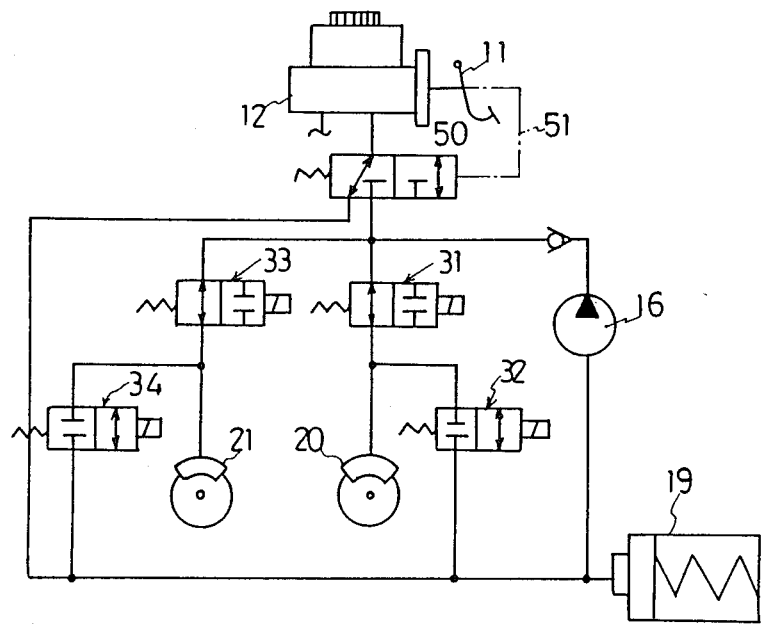
FIG. 7 shows a sixth embodiment of the present invention.
Figure 8:
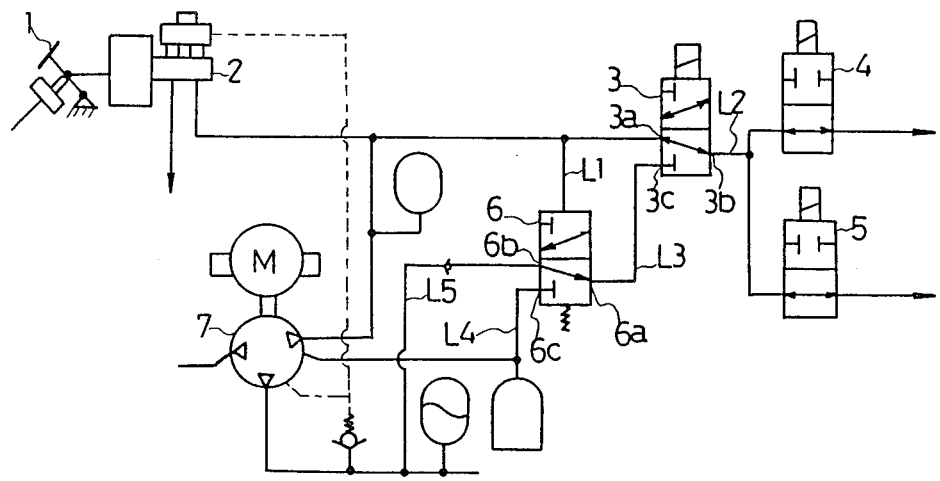
FIG. 8 shows a prior art fluid circuit of the brake control device.

FIGS. 6 and 7 show fifth and sixth embodiments of the present invention which are similar to the embodiments in FIG. 4 and 5, respectvely. The TRC change over valve 50 is actuated in response to link mechanism 51 connected to the brake pedal 11. The other parts and devices are same with those in the previous embodiments and same reference numbers are shown on the same parts or devices.

Obviously, many modifications and variations of the present invention are possible in light of the above teachings. It is, therefore, to be understood that within the scope of the appended claims the invention may be practiced otherwise than as specifically described herein.

What we claim is:

1. A brake control device for a vehicle wheel, comprising:
   a pedal-actuated master cylinder having an outlet,
   a wheel cylinder for braking the vehicle wheel,
   first valve means having an outlet, and an inlet communicating with said master cylinder outlet, and an outlet,
   first fluid conduit means extending from said first valve means to said wheel cylinder,
   a fluid pump having an inlet and an outlet,
   second fluid conduit means extending from said first valve means to said pump inlet, second valve means disposed in said first fluid conduit means and having an inlet and an outlet, said pump outlet communicating with said inlet of said second valve means, shifting means for shifting said first valve means between: (a) an anti-skid braking position in which said outlet of said first valve means communicates with said inlet of said second valve means through said first fluid conduit means, and (b) a traction control position in which said outlet of said first valve means communicates with said pump inlet through said second fluid conduit means, and for shifting said second valve means between (c) a pressure-applying position in which said inlet of said second valve means communicates with said wheel cylinder, and (d) a pressure-relieving position in which said wheel cylinder communicates with said pump inlet, relief conduit means for conducting fluid from said pump outlet to said master cylinder when a pump outlet pressure exceeds a master cylinder pressure by a predetermined value, sensing means for sensing skidding and slipping conditions of the vehicle wheel, and control means operably connected to said sensing means for causing said second valve means to be selectively shifted between said pressure-applying and pressure-relieving positions in response to sensed skidding conditions of the vehicle wheel, and for causing said first valve means to be shifted between said anti-skid braking position and said traction control position in response to sensed slipping conditions of the vehicle wheel.

2. A brake control device according to claim 1, wherein said second valve means comprises first and second valve members, said valve member defining said inlet of said second valve means and adapted to establish said pressure-applying position of said second vale meas in which said inlet thereof is communicated with said wheel cylinder, said second valve member defining said pressure-relieving position of said second valve means in which said wheel cylinder is communicated with said pump inlet.

3. A brake control device according to claim 1, wherein said shifting means comprises first and second shifting means operably connected to said first and second valve means, respectively.

4. A brake control device according to claim 3, wherein said first shifting means comprises means for applying fluid pressure from said master cylinder outlet to said first valve means for shifting same.

5. A brake control device according to claim 1 including a brake pedal operably connected to said master cylinder, said first shifting means comprises a mechanical linkage between said pedal and said first valve means.

6. A brake control device according to claim 1, wherein said control means is operable to retard operation of said fluid pump in response to a sensed pressure of a preselected magnitude in said first conduit means.

* * * * *